Aug. 25, 1925.  
T. F. DEPUY  
1,551,012  
COOKING STOVE  
Filed Feb. 20, 1923  
2 Sheets-Sheet 1
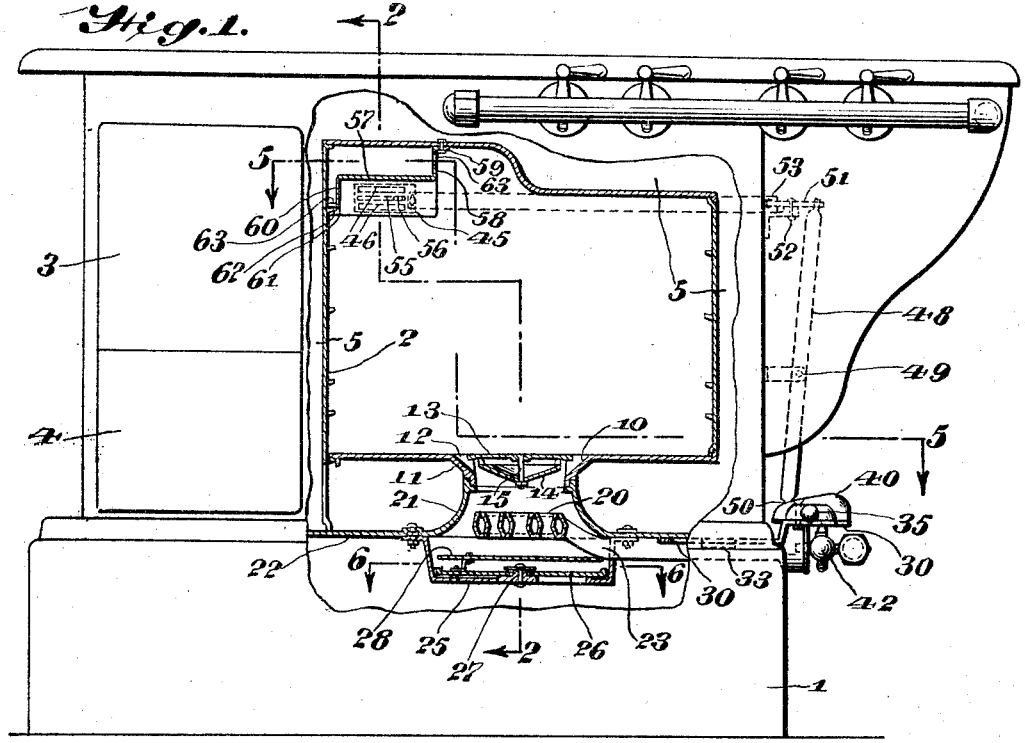
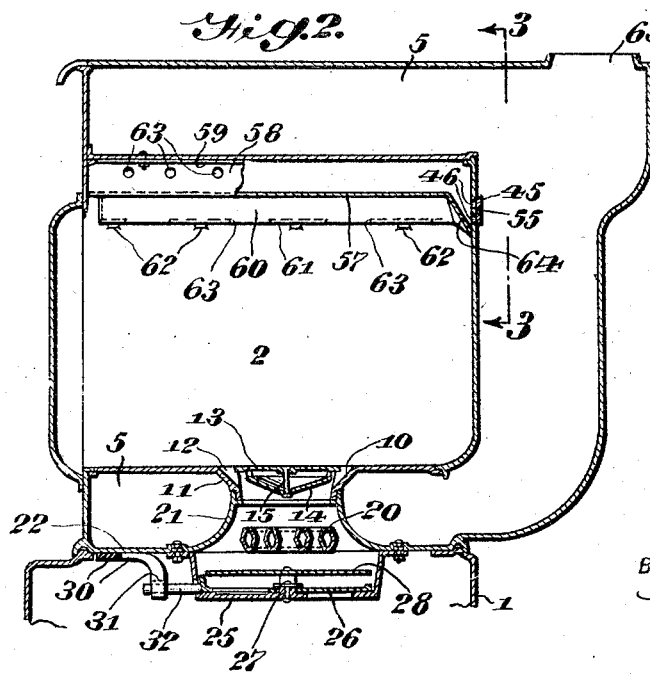
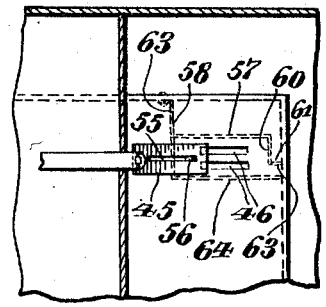
INVENTOR.  
Thomas F. Depuy  
BY  
Cyrus W. Anderson  
ATTORNEY.

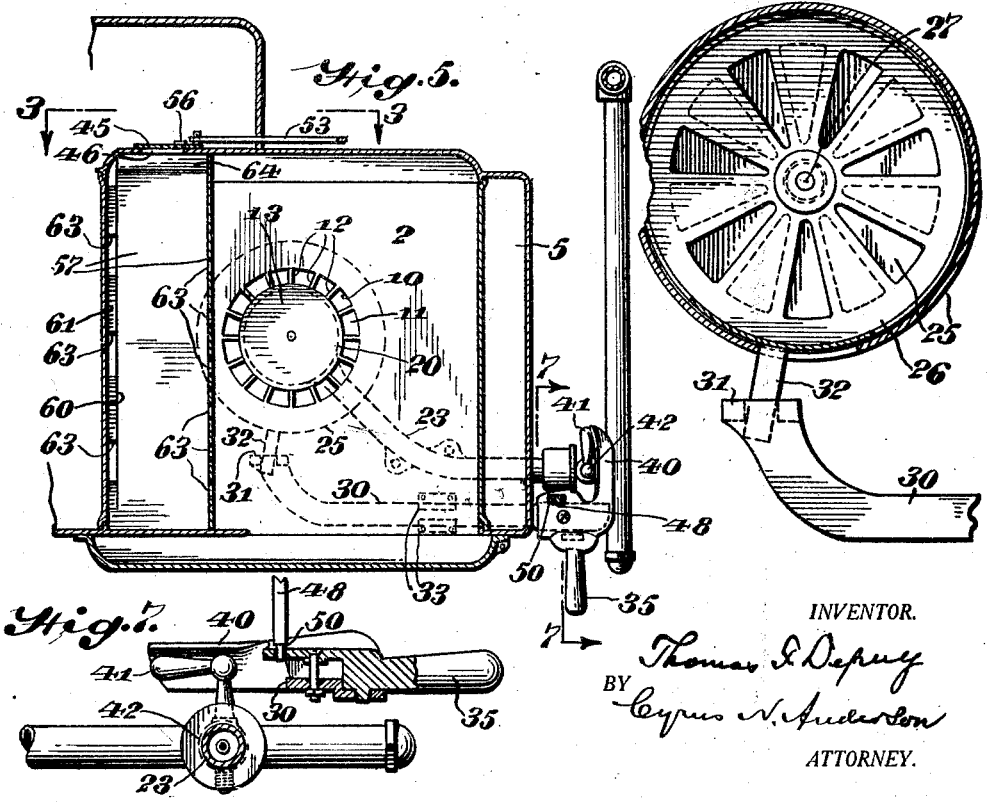

Patented Aug. 25, 1925.

1,551,012

UNITED STATES PATENT OFFICE.

THOMAS F. DEPUY, OF MAUCH CHUNK, PENNSYLVANIA, ASSIGNOR TO LEHIGH STOVE AND MANUFACTURING COMPANY, OF LEHIGHTON, PENNSYLVANIA, A CORPORATION OF PENNSYLVANIA.

COOKING STOVE.

Application filed February 20, 1923. Serial No. 620,144.

To all whom it may concern:

Be it known that I, THOMAS F. DEPUY, a citizen of the United States, and a resident of Mauch Chunk, in the county of Carbon and State of Pennsylvania, have invented an Improvement in Cooking Stoves, of which the following is a specification.

My invention relates to cooking stoves and I have shown the same embodied in a combined coal and gas cooking stove.

More specifically the invention relates to the means for heating the stove by means of gas.

The general object of the invention is to provide a novel construction of means whereby a plurality of dampers may be simultaneously actuated and whereby also the means for operating the dampers controls the position of the valve or gas cock by means of which the supply of gas to the burners is controlled.

A further object of the invention is to provide means interiorly of the oven of the stove whereby when gas is supplied as a heating means moisture will not be allowed to settle or condense upon the inner surfaces of the walls of the said oven.

To these and other ends my invention comprehends the construction as hereinafter described in detail and as illustrated in the accompanying drawings in which one form of embodiment of the invention is shown. It will be understood, however, that changes in the details of construction may be made within the scope of the claims without departing from the said invention.

In the drawings:

Fig. 1 is a view partially in front and partially in vertical section, said section being taken in a plane parallel to the front of the stove;

Fig. 2 is transverse sectional view taken on the line 2—2 of Fig. 1;

Fig. 3 is a sectional view taken on the line 3—3 of Figs. 2 and 5;

Fig. 4 is a view in side elevation of the stove shown in Figs 1 and 2;

Fig. 5 is a horizontal sectional view taken on the line 5—5 of Fig. 1;

Fig. 6 is a horizontal sectional plan view taken on the line 6—6 of Fig. 1 showing the damper for supplying air to the gas burners; and Fig. 7 is a sectional view taken on the line 7—7 of Fig. 5.

Referring to the drawings: 1 designates the base portion of a stove upon which the oven 2 and other portions of the structure are supported. 3 indicates the fire-box wherein solid fuel may be burned and 4 an ash receiving pit. These portions of the structure will not be referred to further in detail because they constitute no part of the invention.

The oven is as usual surrounded by conduits, such as indicated at 5, for conveying the heated gases around the same so as to effect heating thereof.

The bottom of the oven is provided at its center with an opening, as indicated at 10, which opening is surrounded by a downwardly and inwardly extending lip portion 11. Lugs or projections 12 are provided at intervals upon which the outer edges of a baffle-plate 13 are supported. This baffle-plate is provided with a projecting shield 14 secured thereto by means of a bolt 15. Burners 20 are located below the said shield and baffle-plate which burners are surrounded by a wall 21 which extends upwardly from the bottom 22 of the stove. Gas is supplied to the burners 20 through a gas supply pipe 23. Situated underneath the burner is a draft damper comprising a stationary part 25 having openings therein of the shape indicated in Fig. 6. The stationary damper plate member 25 is supported from the bottom 22 of the stove structure, as indicated in Fig. 1 of the drawings. Upon the top of this stationary plate an oscillatable plate 26 is mounted being secured thereto by means of a pivot bolt 27. This plate likewise is provided with openings which are adapted to register with the openings within the stationary plate 25. Dampers of the construction of that indicated are well known and consequently further description thereof will not be given here.

Supported upon the plate 26 of the damper structure is a spreader plate 28. The oscillatable plate 26 is adapted to be oscillated or partially rotated by means of an actuating bar 30 having a downwardly turned slotted end portion 31 which is in engagement with a projection 32 from the plate 26. The actuating bar 30 is slidably supported upon supporting guides or lugs 33 upon the bottom of the stove 22. A handle 35 is connected to the outer end of the actuating bar 30 whereby the latter may be moved in and out to operate the oscillatable plate 26 to regulate the passageways for the flow of air through the damper structure previously referred to. The said handle is provided with an inwardly projecting portion 40 which constitutes a shield for the handle 41 by means of which the valve or cock 42 is adapted to be opened and closed for controlling the passage of gas from the source of supply through the pipe 23 to the burners 20. The relation of the protecting shield 40 to the handle 41 is such that the latter cannot be opened until the handle 35 is moved so as to operate the bar 30 to open the damper. It will be seen also that as the handle 35 is moved in the opposite direction to close the said damper the protecting shield 40 will contact with the handle 41 to close the valve 42. In other words, the handle 41 cannot be turned to open the valve or cock 42 until the handle 35 has been moved or actuated to turn the damper plate 26 into position to open passageways through the damper whereby air may be supplied to the burners 20.

For the purpose of automatically actuating a flue damper plate 45 in the upper rear side of the oven of the stove to open and close the openings 46 in said rear side I have provided a vertical lever 48 pivoted intermediate its ends at 49 to a small bracket or knee upon the adjacent side of the stove. The lower end of this lever is in engagement with an opening 50 provided in a projecting portion of the handle 35. The upper end of the vertical lever 48 is connected with the front end of a horizontal lever 51 pivoted intermediate its ends at 52 to a small bracket or knee upon the adjacent side of the stove. The opposite rear end of the lever 51 is connected with the outer end of a slide bar 53 slidably supported upon the outer side of the rear wall of the oven. The inner end of the said bar is connected with the damper plate 45 previously referred to. The said damper plate is provided with a slot 55 through which a projection 56 extends by means of which the said damper plate is slidably supported in operative relation to the openings 46 which are adapted to be controlled thereby.

The openings 46 are situated at the rear end of a chamber formed within the oven by a plate 57 which is of Z-shape in cross-section. The upwardly extending flange 58 of this plate is provided with a horizontally extending flange 59 which is secured to the underside of the top of the stove by rivets, as shown in Fig. 1. The depending portion 60 of the member 57 is provided with an outwardly extending flange 61 which rests upon projections 62 which extend inwardly from the adjacent side of the oven of the stove. The flanges 58 and 61 are each provided with notches or slots 63 by reason of the presence of which circulation of the heated gases within the oven is effected whereby when the damper 45 is open the deposition of moisture upon the interior surface of the oven is prevented or avoided. The front end of the member 57 abuts against the front wall of the oven of the stove while the rear end thereof is provided with a downwardly extending portion 64 which contacts with or abuts against the rear wall of the stove along a line immediately below the openings 46.

The gases are conveyed from the stove structure through an opening 65 which in the usual manner communicates with a pipe or conduit not shown.

It will be seen that by my invention I have provided a simple construction of novel means whereby both the top and bottom dampers employed in connection with the gas heating mechanism of the stove structure may be controlled by a single lever; and have also provided means whereby the handle for controlling the flow of gas to the stove is protected so that it may not be accidentally opened. It will also be seen that I have provided means whereby the handle for controlling the gas for the burners cannot be opened until the dampers have been opened.

Having thus described my invention what I claim and desire to secure by Letters Patent is:

1. In a cooking stove, the combination of a gas burner, a valve for controlling the flow of gas to said burner, said valve having a handle by means of which it may be operated, a draft damper for controlling the supply of air to the said burner, said damper being provided with a movable member, a movable actuating device for operating the said movable member, said actuating device being provided with a handle whereby its movement may be effected and the said actuating device being also provided with a projection for shielding the handle upon the said valve and for contacting therewith when the said damper is closed to effect closing of the said valve to thereby control the supply of gas to said burner.

2. In a cooking stove, the combination of an oven having a central opening in its bottom, a stationary baffle-plate supported in said opening and having its top surface flush with the top surface of said bottom, a burner situated underneath the said baffle-plate, a draft damper for controlling the supply of air to said burner, said damper comprising a movable member, an actuating device having connection with the said movable member and extending to and projecting from a side of the stove, said device being provided with a handle whereby the same may be operated, a pipe for supplying gas to said burner, a valve for controlling the flow of gas through said pipe, said valve having an operating handle secured thereto and the said actuating device having a projecting portion which constitutes a protecting shield for the said handle and which projecting portion is adapted to contact with the said handle to close the said valve upon movement of the said actuating device to close the movable member of the said draft damper.

3. In a cooking stove, the combination of an oven having one or more openings leading into the exhaust flue of the stove structure and the said oven also having an opening in the bottom thereof, a damper plate for closing the first of said openings, a stationary baffle-plate situated in the opening in the bottom of said stove, burners situated underneath the said baffle-plate, a draft damper comprising a movable member for opening and closing openings through said damper, an actuating device having connection with the said movable member whereby the latter may be actuated, a pipe for supplying gas to the said burners, and a valve in said pipe for controlling the flow of gas therethrough, said valve having a handle by means of which it may be operated and the said actuating device having a portion at its outer end which is adapted to shield and protect the said handle to prevent accidental operation thereof and the said projection contacting with the said handle to close the same when the said actuating device is moved in a direction to close the said movable member of the said draft damper.

4. In a cooking stove having an oven the bottom of which is provided with an opening therein surrounded by a downwardly extending lip portion having lugs located at intervals upon the inner side thereof, in combination, a stationary baffle-plate supported in said opening with its top surface flush with the top surface of the said bottom and constituting in effect a part of the bottom of the stove, said baffle plate having its edges spaced from the edges of said opening, a stationary gas burner located directly underneath and a distance from said baffle-plate, and means for controlling the supply of gas to said burner.

5. In a cooking stove having an oven the bottom of which is provided with an opening therein surrounded by a downwardly extending lip portion having lugs located at intervals upon the inner side thereof, in combination a stationary baffle-plate supported upon said lugs with its top surface flush with the top surface of the said bottom, and having its edges spaced from the edges of said opening, a protecting shield secured to the under side of the said baffle-plate and a gas burner located a distance below the said protecting shield, substantially as described.

6. A cooking stove comprising, in combination, an oven provided with a bottom having an opening therein, a stationary baffle-plate supported in said opening with its top surface flush with the top surface of the said bottom, and having its edges spaced from the edges of said opening, a protecting shield supported upon and being situated below the said baffle-plate, a chamber situated directly below the said opening and being in direct communication therewith, a gas burner situated within the said chamber directly underneath and a distance from the said protecting shield, substantially as described.

In testimony that I claim the foregoing as my invention I have hereunto signed my name this 16 day of February, A. D., 1923.

THOS. F. DEPUY.